Oct. 20, 1959    J. E. POWELL    2,909,304
COMBINATION EGG HOLDER AND CONDIMENT DISPENSER
Filed July 28, 1958
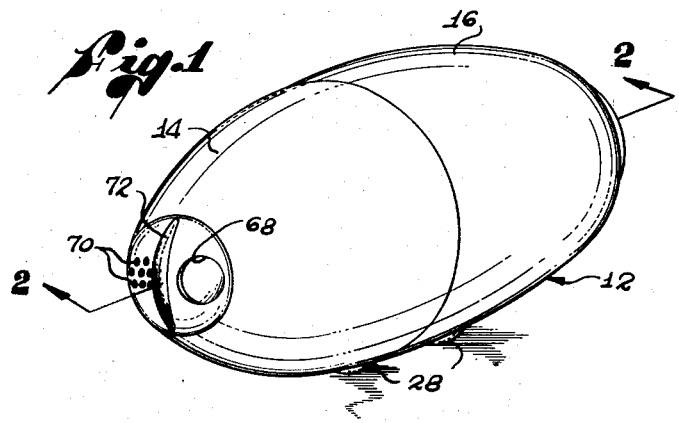
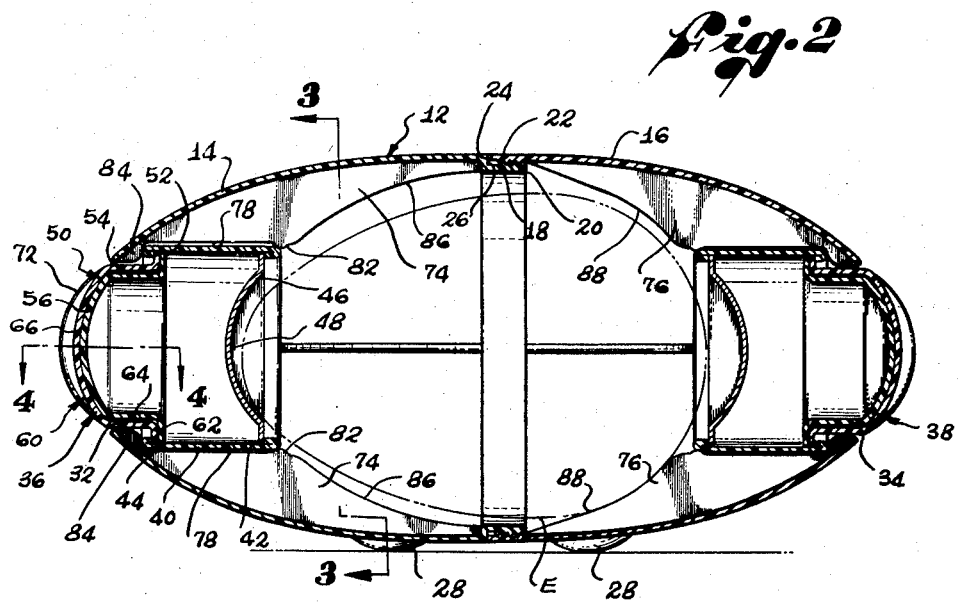
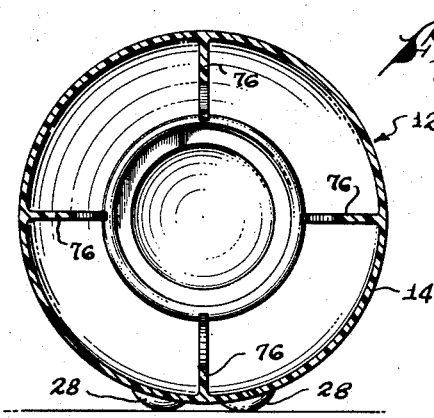
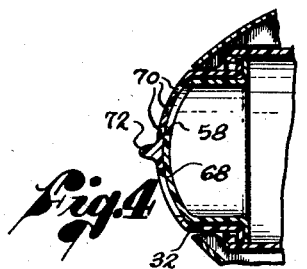
INVENTOR.
JAMES E. POWELL
BY Forrest J. Lilly
Attorney United States Patent Office 2,909,304
Patented Oct. 20, 1959

2,909,304

COMBINATION EGG HOLDER AND CONDIMENT DISPENSER

James E. Powell, Los Angeles, Calif.

Application July 28, 1958, Serial No. 751,429

6 Claims. (Cl. 222—130)

This invention relates to a container for holding a single hard-boiled egg and has as its general object the provision of a novel combined egg holder and condiment dispenser, preferably a salt and pepper shaker.

Another object of the invention is the provision of an egg container of the character described which is uniquely designed for economy and simplicity of manufacture.

A further object of the invention is the provision of an egg container of the character described having refillable salt and pepper capsules.

The invention will be best understood from the following detailed description taken in connection with the annexed drawings, wherein:

Fig. 1 is a view in perspective of the present egg container;

Fig. 2 is a section taken along line 2—2 of Fig. 1;

Fig. 3 is a section taken along line 3—3 of Fig. 2; and

Fig. 4 is a section taken along line 4—4 of Fig. 2.

Referring now to these drawings, the present egg container then will be seen to comprise a hollow, outer shell 12. This shell conforms approximately to an elliptical figure of revolution so as to simulate the shape of an egg.

Shell 12 comprises a pair of half-shell sections 14 and 16. The open end of shell section 14 has a reduced diameter cylindrical flange 18 which is externally threaded at 20. The open end of shell section 16 is internally threaded at 22 for threaded engagement with the flange 18. In the assembled positions of the shell sections, the inner circular edge 24 of section 16 abuts an inner annular shoulder 26 on the shell section 14 at the base of the flange 18. The outer diameters of the shells 14 and 16, adjacent the shoulder 26 and edge 24 are approximately equal so that when the half-shell sections are threadedly connected, the container 10 has a smooth unbroken surface.

The shell sections 14 and 16 have pairs of rounded suporting pads 28 adjacent their inner open ends. These pads are so located on the two sections as to be aligned lengthwise of the container when the threaded coupling is properly tightened and provide a support for resting the container on a flat surface.

Shell 12 has a pair of circular, axial openings 32 and 34 at its opposite ends. These openings provide access to a pair of identical salt and pepper chambers or capsules 36, 38, respectively.

Each of these capsules has an outer cylindrical body or sleeve 40. Opposite ends of this sleeve are folded in to provide a pair of inwardly facing, annular shoulders 42 and 44 at opposite ends of the sleeve. Slidably received in the inner end of the capsule sleeve 40 is an inner or bottom wall 46. The clearance between the outer circular edge of the wall 46 and the inner cylindric surface of the sleeve 40 is made sufficient to enable sliding movement of the wall in the sleeve but small enough to prevent leakage of salt or pepper. Wall 46 has a central generally dome-shaped center portion 48, the concave side of which faces outwardly of the capsule. The shoulder 42 retains the wall 46 in the capsule sleeve 40.

Tightly fitted within the other or outer end of each capsule sleeve 40 is an inner cap 50. This cap has an inner annular flange 52 which is frictionally held in the sleeve 40 and a central cylindric portion 54. The outer end of the cylinder portion 54 is closed by a dome-shaped end wall 56. This end wall is formed with a circular opening 58.

Rotatably fitted in the outer end of the capsule sleeve 40, outside of the cap 50, is an outer cap 60. This outer cap has an inner annular flange 62 which is rotatably engaged between the sleeve flange 44 and the inner cap flange 52. Outer cap 60 includes a cylindrical portion 64, which encircles the cylinder portion 54 of the inner cap, and a dome-shaped end wall 66 which bears slidably on the end wall 56 of the inner cap.

End wall 66 of the outer cap has a circular opening 68 and a series of small openings 70. Integrally formed on the outer cap is a raised rib or wing 72. This wing is adapted to be grasped for turning the outer cap to selectively align its openings 68 and 70 with inner cap opening 58. The outer cap may also be turned to an intermediate position wherein the inner cap opening is closed.

Salt and pepper capsules 36 and 38 are mounted in the shell sections 14 and 16 by means of a series of ribs 74 and 76 integrally formed on the insides of the sections. These ribs have outer longitudinal edge portions 78 which define axial openings or cavities for receiving the capsules, as shown. Shoulders 82 and 84 at the inner and outer ends of these edges retain the capsules in the positions shown wherein the end walls 66 of the outer caps 60 of the capsules are located in the shell openings 32 and 34. The curvature of the cap end walls is such that they merge smoothly with the outer surface of the shell 12, as shown.

The inner rib shoulders 82 are made relatively small so as to permit inserting of the capsules 36 and 38 to the position shown from the inner open sides of the shell sections 14 and 16. The parts are made sufficiently flexible to enable the capsules to be forced past the inner shoulders 82, the latter then springing in behind the capsules to retain the latter in position.

In use of the container, the two half-shell sections 14 and 16 are unthreaded to permit positioning of an egg E therein in the manner illustrated. The shell sections are then threadedly coupled. The inner edge portions 86 and 88 of the ribs 74 and 76 serve to support the egg in the container and are contoured, as shown, to define a generally egg-shaped cavity. The curvature of the dome-shaped portions 48 of the capsule end walls 46 conforms substantially to the curvature of the ends of the egg. Slidable engagement of the end walls in the capsule sleeves 40 allows adjustment of the end walls to compensate for varying overall length of eggs.

It will be apparent, therefore, that there has been described and illustrated a combined egg container and salt and pepper shaker which is fully capable of attaining the objects and advantages preliminarily set forth.

While a preferred embodiment of the invention has been described and illustrated, various modifications in design and arrangement of parts are possible within the scope of the following claims.

I claim:

1. A combination egg holder and condiment dispenser comprising a hollow, elongate shell formed with an internal, generally egg-shaped cavity having its axis extending lengthwise of the shell and spaced at one end from the adjacent end of the shell, a salt chamber in the space between said one end of the cavity and said adjacent end of the shell including a movable inner end wall which forms an adjacent end wall of said cavity, said chamber having an opening through said adjacent end of the shell, said shell being split along a transverse plane approximately midway between the ends of said cavity into a pair of half-shell sections to permit placing of an egg in said cavity, and coupling means on said sections for releasably securing the latter together.

2. A combination egg holder and condiment dispenser comprising a hollow, generally ellipsoidal shell, ribs integrally joined to the inner surface of said shell and disposed in angularly spaced, axial planes of the shell, said ribs having inner edges which define a first generally egg-shaped cavity approximately coaxial with and spaced at one end from the adjacent end of the shell, said ribs including end portions between said adjacent end of the shell and said one of said cavity having inner, longitudinally extending edges defining a second axial cavity in the shell opening at one end to said first cavity, said adjacent end of the shell having an opening aligned with and reduced relative to said second cavity, a salt capsule in said second cavity and supported on said longitudinal rib edges, the outer end of said capsule being accessible through said shell opening and having openings through which salt may be poured into and from said capsule, said ribs having shoulders at the inner end of said second cavity engaging the inner end of said capsule for retaining the latter in said second cavity, said shell and ribs being split along a transverse plane approximately midway between the ends of said first cavity into a pair of half-shell sections to permit placing of an egg in said first cavity, and coupling means on said sections for releasably securing the latter together.

3. The subject matter of claim 2 wherein said shell and ribs are slightly flexible to permit forcing of said capsule past said shoulders into said second cavity through said inner end of the latter.

4. A combination egg holder and condiment dispenser comprising a hollow, generally ellipsoidal shell, ribs integrally joined to the inner surface of said shell and disposed in angularly spaced, axial planes of the shell, said ribs having inner edges which define a first generally egg-shaped cavity approximately coaxial with and spaced at opposite ends from the ends of said shell, said ribs including opposite end portions between the ends of the shell and the ends of said cavity having inner, longitudinally extending edges defining second axial cavities at opposite ends of the shell opening at their inner ends to said first cavity, the ends of said shell having openings aligned with and reduced relative to said second cavities, a salt capsule in one of said second cavities and supported on said ribs, a pepper capsule in the other second cavity, the outer ends of said capsules being accessible through said shell openings and having openings through which salt and pepper may be poured into and from the capsules, said ribs having shoulders engaging the inner ends of said capsules for retaining the latter in said second cavities, said shell and ribs being slightly flexible to permit forcing of said capsules past said shoulders into said cavities through said inner ends of the latter, said shell and ribs being split along a transverse plane approximately midway between the ends of said first cavity into a pair of half-shell sections to permit placing of an egg in said first cavity, and coupling means on said sections for releasably securing the latter together.

5. The subject matter of claim 4 wherein said capsules include inner, axially movable end walls forming end walls of said first cavity, said end walls having concave inner surfaces facing toward said first cavity for engaging opposite ends of an egg in the latter cavity.

6. A combination egg holder and condiment dispenser comprising a hollow, generally ellipsoidal shell, ribs integrally joined to the inner surfaces of said shell and disposed in angularly spaced, axial planes of the shell, said ribs having longitudinally extending inner edges at opposite ends of the shell defining a pair of axial cavities at opposite ends of the shell, said cavities having open inner ends and reduced open outer ends opening through the ends of said shell, a pair of salt and pepper capsules in said cavities and supported on said ribs, means for retaining said capsules in said cavities, the outer ends of said capsules being accessible through the openings in the ends of said shell and having openings through which salt and pepper may be poured into and from the capsules, said shell being split along a transverse plane midway between its ends into a pair of half-shell sections having facing open sides through which said capsules may be inserted into said cavities through the open inner ends of the cavities, and coupling means on said sections for releasably joining the latter.

References Cited in the file of this patent

UNITED STATES PATENTS 2,464,307   Griffin et al. _____ Mar. 15, 1949

FOREIGN PATENTS 597,078   France _____ Nov. 12, 1925